Sept. 23, 1924.  
W. L. PAUL  
ROLLING COLTER FOR DISK PLOWS  
Filed Feb. 24, 1921  
1,509,310  
2 Sheets-Sheet 2
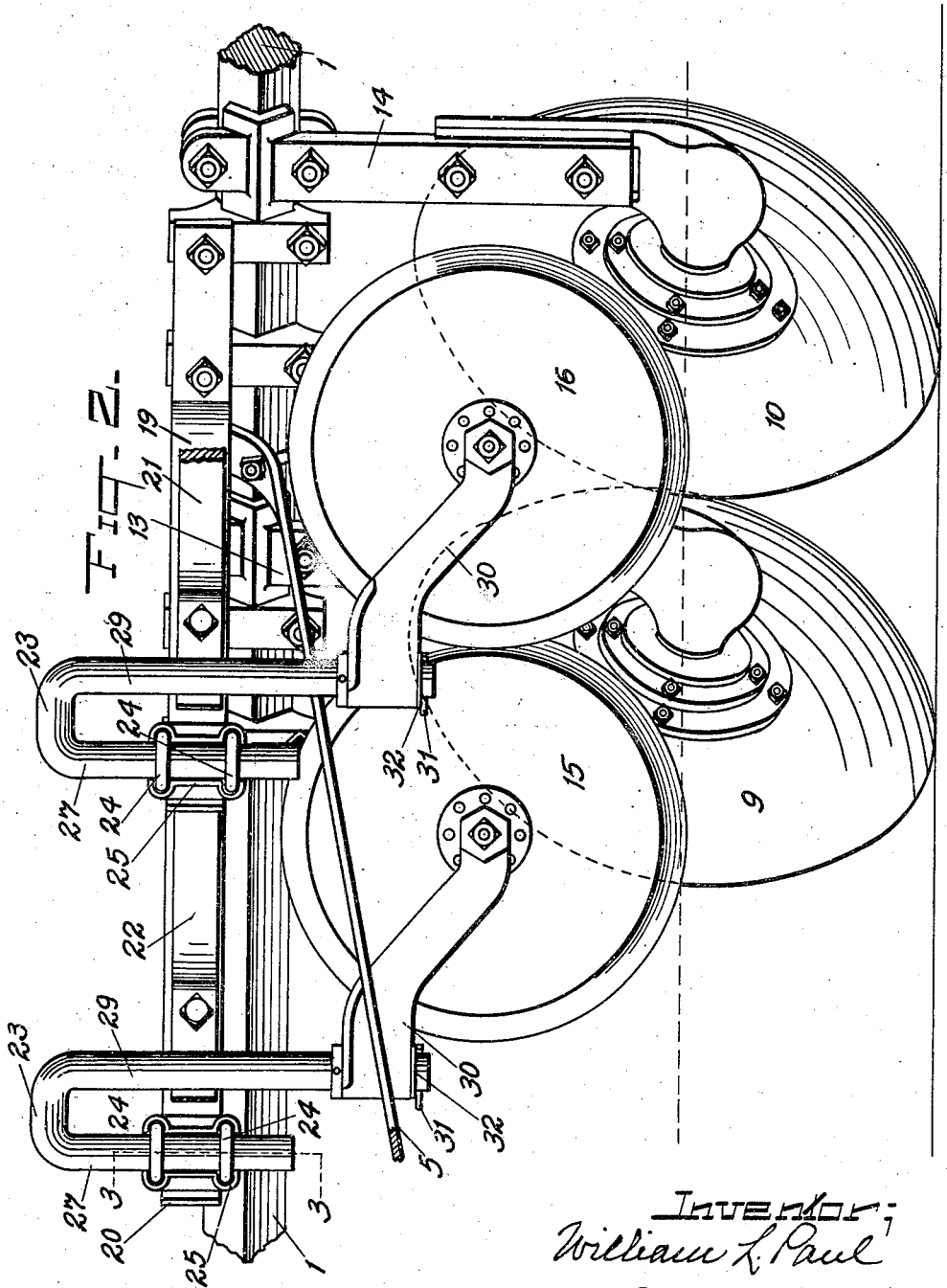

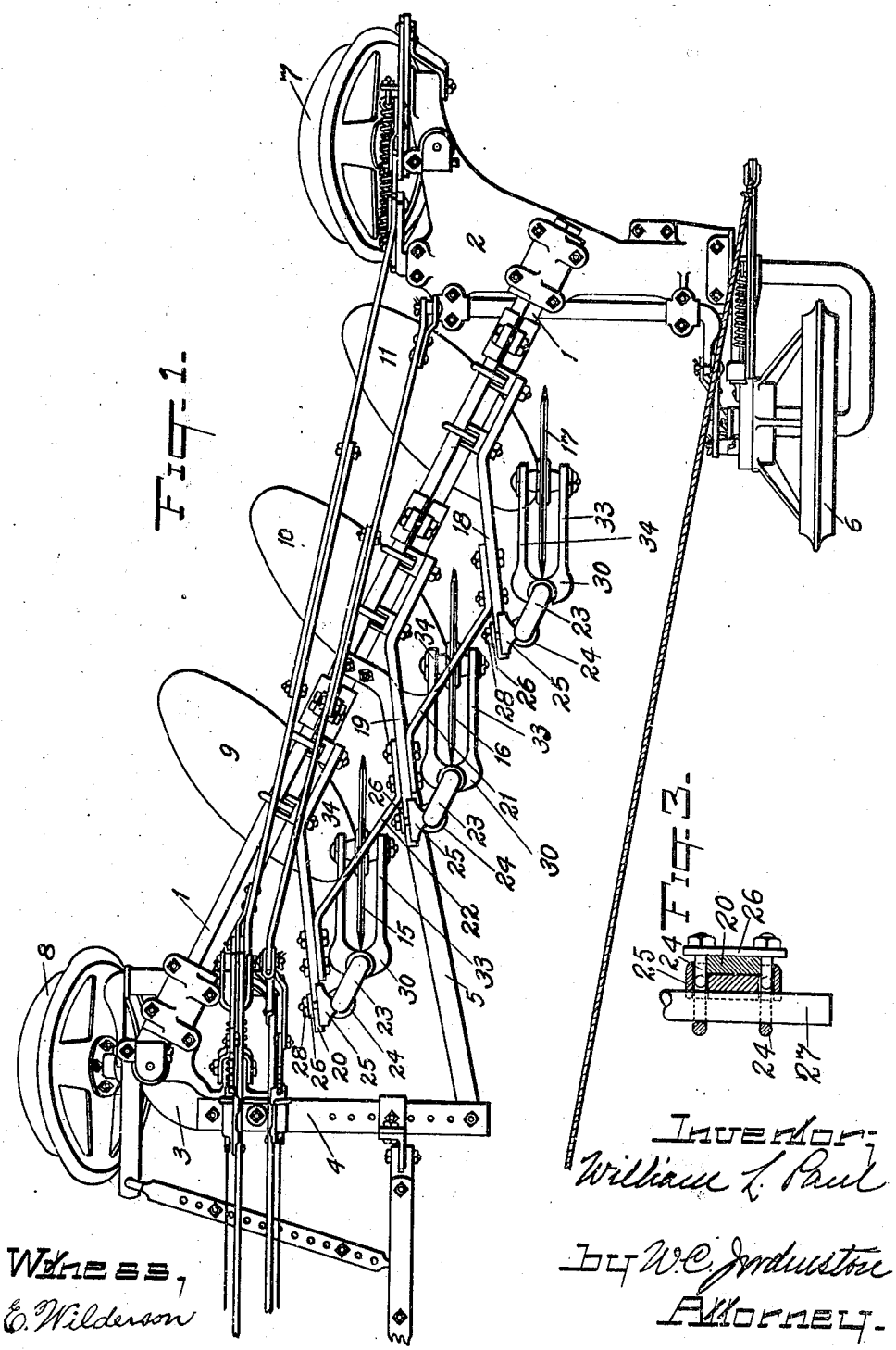

Patented Sept. 23, 1924.

1,509,310

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

ROLLING COLTER FOR DISK PLOWS.

Application filed February 24, 1921. Serial No. 447,397.

*To all whom it may concern:*

Be it known that I, WILLIAM L. PAUL, a citizen of the United States, residing at Berkeley, in the county of Alameda and State of California, have invented certain new and useful Improvements in Rolling Colters for Disk Plows, of which the following is a specification, reference being had therein to the accompanying drawing.

My invention relates to disc plows, more particularly of the gang type, and has for its object to provide a rolling colter for each disk, adjustable, and located and operative in close proximity to the edges of the disks for the purpose of cutting, crushing and holding trash, such as weeds, stalks and the like, so that the forward rotary action of the disks will more readily catch and cover such trash with earth in the furrows in the operation of plowing.

Referring to the drawings in which similar numerals indicate identical parts—

Figure 1 is a plan view of a disk gang plow embodying my invention.

Figure 2 is an enlarged fragmentary view of the plow taken from the landward side, and Figure 3 is a detail section on the line 3—3 of Figure 2.

The plow shown is of the type having a diagonally disposed beam 1 which is rigidly secured to a rear casting 2 and to a forward casting 3. A draw bar 4 is also secured to the casting 3, and a brace 5 is bolted to the landward end of the drawbar 4 and extends to the beam 1 to which it is rigidly secured. The parts just stated practically form the frame of the plow which is supported on a landwheel 6, a rear furrowwheel 7 and a front furrowwheel 8.

The plows or disks 9, 10 and 11 are respectively mounted on standards 12, 13, and 14 rigidly secured to the beam 1. To the beam 1 is securely bolted equidistant arms 18, 19 and 20 parallel, for part of their lengths, with the beam 1, and then extended forwardly at substantially an acute angle to the beam 1. A brace 21 is rigidly secured to the arm 18 and extends to the arm 19 to which it is bolted, and a similar brace 22 is provided between the arms 19 and 20. The colters 15, 16 and 17 are all mounted in a similar manner and it is considered a description of one will suffice.

A vertically disposed bifurcated member 23 is adjustably secured to an arm 18 by eye bolts 24 which extend through a block 25 and a strap 26 on opposite sides respectively of the arm 18 and at its forward extremity. The arm 27 of the bifurcated member 23 is held in the eyes of the eye bolts 25 and is drawn tightly against the block 25 by nuts 28 on the ends of the eye bolts 24. The arm 29 of the member 23 is of greater length than the arm 27 and on its lower end is pivotally supported a yoke 30 secured in place by a cotter or pin 31 and a washer 32. The colter 16 is rotatably supported between the arms 33 and 34' of the yoke 30, and at the extremity thereof, and as the yoke 30 is pivotally supported on the arm 29, the colter freely follows the draft. By loosening the eye bolts 24, it is readily apparent that the distance of the colter from the plowing disk can be regulated by swinging the member 23 on its arm 27, and when the desired adjustment has been made the bolts are again tightened and the member 23 is held rigidly in place; I prefer, however, to position the the colter in close proximity to the plowing disk for best results. The colter can also be adjusted vertically, when the eye bolts are loosened, by raising or lowering the member 23 in the eye bolts to the position desired, by this latter adjustment the depth to which the colter is required to operate is readily fixed.

I have shown my improvement in a power lift plow in which the traction power of the landwheel is utilized to raise the plow, the type of power lift employed, however may be any one of various types, nor I do limit myself to the particular construction of the plow as shown or to specific devices for different adjustments.

The preferred position of the colter is, as shown in the drawings, as close as possible to the edge of the adjacent disk, without contacting therewith, and the axis of the colter is slightly rearward of a vertical line tangent to the forward edge of the disk, consequently the lowermost point of the cutting edge of the colter is rearward of the extreme forward point of the disk, which is shown operating at its greatest depth with its horizontal diameter substantially at the ground surface, the colter having its lowermost point substantially at the ground surface and approximately in the plane of the horizontal diameter of the disk so that the colter will catch, and cut stalks and other trash which may be in its path. The disk also has a cutting action upon stalks and other trash in its path, and as the foremost point of the edge of the disk and the lowest point of the colter are close together, there is coaction between them to efficiently cut such trash as may be upon the surface of the ground. This relative position of the colter and disk may be varied as previously explained. The best results are obtained by the location of the colter as shown, the colter cutting or breaking stalks and other field trash close to the adjacent edge of the disk so that the action of the latter in turning the soil will more readily cover such trash with freshly turned earth.

What I claim is—

1. In a disk plow the combination of a frame, a plowing disk and a colter; an arm rigidly mounted on the frame and extending forwardly a support for said colter pivotally mounted on the arm and normally rigid therewith but adapted to be swung laterally to vary the position of the colter relative to the cutting edge of the disk.

2. In a disk plow the combination of a frame, a plowing disk and a colter; an arm rigidly mounted on the frame and extending forwardly a vertically disposed bifurcated member pivotally supported on said arm by one arm and normally rigid therewith; the colter mounted on the second arm; said member adapted to be swung laterally on its pivot and adjusted vertically to vary the relative position of the colter with the cutting edge of the disk.

3. In a disk plow the combination of a frame, a plowing disk and a colter; an arm rigidly mounted on the frame and extending forwardly a vertically disposed bifurcated member pivotally supported on said arm by one arm and normally rigid therewith; the colter pivotally mounted on the second arm; said member adapted to be swung laterally on its pivot to vary the relative position of the colter with the cutting edge of the disk.

4. In a disk plow, the combination with a plowing disk, of a rolling colter supported in close proximity to the disk and having the lowest point on its edge contiguous to the foremost point of the edge of the disk.

5. In a disk plow, the combination with a plowing disk, of a rolling colter supported in close proximity to the disk, whereby the cutting edge of the disk and the cutting edge of the colter coact in a substantially simultaneous cutting action.

6. In a disk plow, the combination with a plowing disk, of a rolling colter operating in close proximity to the disk and having the lowermost point of its cutting edge substantially in the plane of the horizontal diameter of the disk.

7. In a disk plow, the combination with a disk, of a rolling colter supported in close proximity to the disk, having its axis above and forward of the axis of the disk and the lowermost point of its cutting edge contiguous to the extreme forward reach of the disk, whereby the edge of the colter and the edge of the disk co-operate substantially simultaneous in a cutting operation.

8. In a disk plow, the combination with a plowing disk, of a rolling colter supported in close proximity to the disk and having the lowermost point of its cutting edge contiguous to the forward cutting edge of the disk substantially at the ground surface and co-operating with said disk in a substantially simultaneous cutting action.

9. In a disk plow, the combination with a frame and a plowing disk, of a rolling colter supported on the frame in close proximity to the disk and vertically adjustable, the cutting edge of the disk and the cutting edge of the colter coacting in a substantially simultaneous cutting action irrespective of said adjustment.

WILLIAM L. PAUL.